Jan. 13, 1948.  P. G. CHACE ET AL  2,434,393
RADIATOR VENT VALVE
Filed Oct. 14, 1943  2 Sheets-Sheet 1

Paul G. Chace,
Unto U. Savolainen,
Inventors.
Haynes and Koenig,
Attorneys.

Jan. 13, 1948. P. G. CHACE ET AL 2,434,393
RADIATOR VENT VALVE
Filed Oct. 14, 1943 2 Sheets-Sheet 2

Paul G. Chace,
Unto U. Savolainen,
Inventors.
Haynes and Koenig
Attorneys.

Patented Jan. 13, 1948

2,434,393

UNITED STATES PATENT OFFICE 2,434,393

RADIATOR VENT VALVE

Paul G. Chace, Attleboro Falls, and Unto U. Savolainen, Attleboro, Mass., assignors to Metals & Controls Corporation, Attleboro, Mass., a corporation of Massachusetts Application October 14, 1943, Serial No. 506,132

3 Claims. (Cl. 236—62)

This invention relates to radiator vent valves, and with regard to certain more specific features, to thermostatic control valves of this class.

Among the several objects of the invention may be noted the provision of a reliable, precalibrated, inexpensive, compact, replaceable and interchangeable radiator vent valve unit which will perform the usually desired functions of temperature and anti-flood control; the provision of a valve in the class described which performs its temperature control function as well with an open float as with a sealed-in float (or without a float), and without expansion bellows and with less tendency to corrode; the provision of a valve in the class described which will maintain a narrower temperature differential for the radiator on which it is located; the provision of such a device in which the calibration is unaffected by the ordinarily encountered water hammer or the like; and the provision of a device of this class which has the critical elements thereof of simplest form for easy manufacture and which may be placed in a most advantageous position for reliable operation. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which are illustrated several of various possible embodiments of the invention, Fig. 1 is a side elevation showing an application of our invention;

Similar reference characters indicate corresponding parts throughout the several views of the drawings.

Heretofore valves have been constructed for permitting air to escape from heating systems while preventing the escape of steam or water. These included thermostatic controls but were for the most part of large size and were not thoroughly reliable in operation; and besides they were difficult to replace, or to interchange to meet varying operating conditions. Calibration was also difficult.

By means of the present invention strong and reliable thermostatic control elements are placed in a small and inexpensive replaceable cartridge unit whereby quick adaptations of proper units may be made to meet desired conditions or to make repairs.

Figure 1:
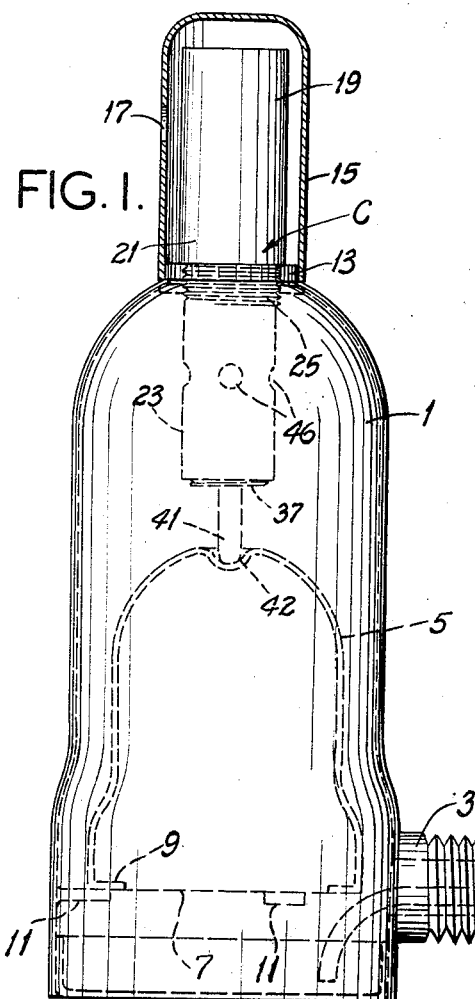

Referring now more particularly to Fig. 1, there is shown at numeral 1 a hollow casing providing a chamber on which is a nipple 3 for attachment for example to a steam heating radiator, the attachment being made in the usual way and in the usual place where air to be released ascends ahead of the steam which is not to be released.

Inside of the chamber 1 is an inverted bell-shaped float 5, which may be open at the bottom as indicated at 7. It may be stated at this point that one of the advantages of the present invention is that this float needs not have a closed bottom nor that it be hermetically sealed, since the thermostatic operation does not depend upon any hermetically sealed float.

At its bottom edge the float rests upon supports 11 carried on the chamber 1. If the system connected with nipple 3 floods, water gathers in the base of the chamber 1. Upon this water the bell 5 floats after a certain level is reached. When the tendency to flood subsides, the water flows out again through the nipple 3 and into the heating system, complete emptying of the chamber 1 being facilitated by means of the usual syphon 8 which connects from the bottom interior of the casing 1 to the interior of the heating system.

On the top of the chamber 1 is located a bushing 13 for the reception of a removable cap 15 having an outlet 17. This cap is not always necessary to the invention. Under the cap 15 is a removable cartridge C shown best in Figure 2 and comprising a unitary tubular casing. It is constituted by a simple cylinder 19 having a larger upper diameter 21 and a smaller lower diameter 23, these being connected by an intermediate threaded portion 25. This permits the insertion and removal of the cartridge or various similar cartridges having the same size of thread 25. The cylinder is hollow, as indicated at 27, and is connected with the atmosphere through an outlet 29, and the outlet 17 in the cover 15. Openings 46 are provided below the thread 25 which function as fluid inlets and also drains for condensate.

Within the cylinder 19 is an operating stem 31, pointed at its upper end, to form a valve member 33 for seating in the opening 29. A shoulder is provided at 36. This acts as a loose guide in the interior 27 and forms an abutment for a double-coiled helical thermostatic element 35. Fluid may flow around shoulder 36. The lower end of the element 35 rests upon an adjustable bearing plug 37 threaded into the lower end of the cylinder 19. The plug 37 is provided with a tool-engaging slot 39 for adjustment purposes. This slot may not be necessary in part 37 if adjustment is incorporated in the top of cylinder 19, as will be described in connection with Fig. 5. The stem 31 has a sliding engagement with the plug 37 and extends downward as indicated at 41. Extension 41 engages a socket 42 formed in the upper portion of the floating bell 5.

Figure 2:
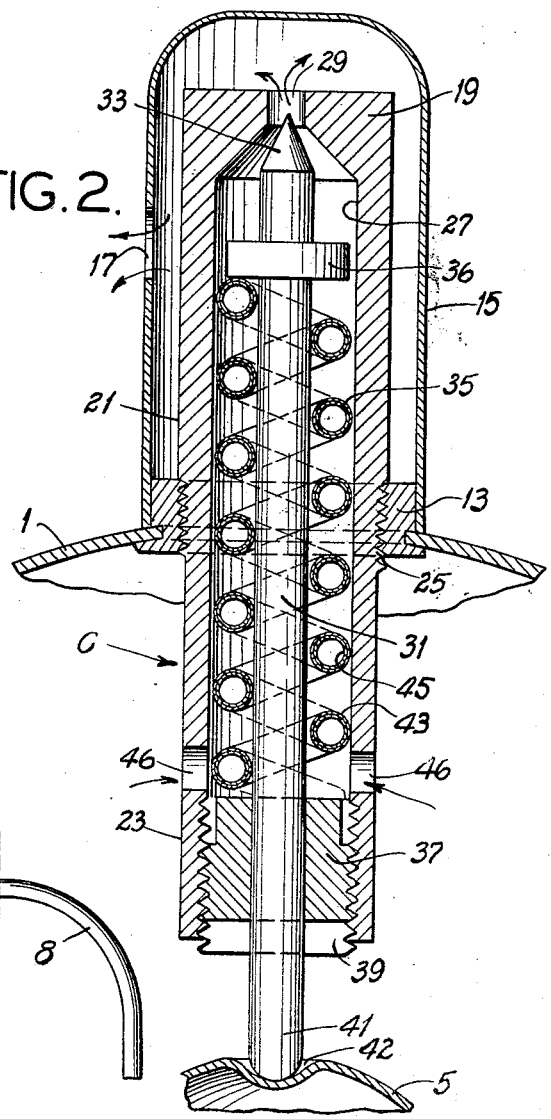
Fig. 2 is an enlarged detailed section of certain thermostatic elements of the invention.
Figure 3:
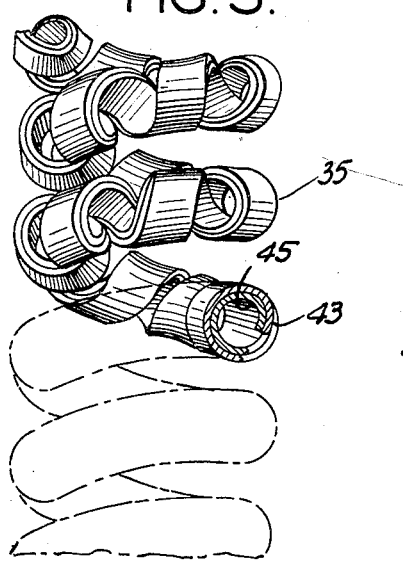
Fig. 3 is a further enlarged fragmentary typical side elevation of the thermostatic element shown in Fig. 2.
Figure 4:
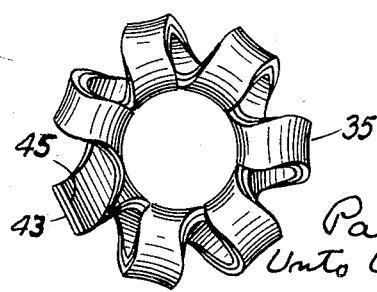
Fig. 4 is a top plan view of Fig. 3.

The general character of the thermostatic element 35 is described in detail in Parsons United States Patent 2,121,259, and briefly consists in a composite strip having bimetallic components of low and high coefficients of expansion numbered 43 and 45 in Figs. 2, 3 and 4. These components are joined together lengthwise by soldering or the like and are then coiled as a small primary helix which is then itself coiled into a larger secondary helix as shown. Depending upon whether the element of high or low coefficient of expansion is inside or outside of the primary helix, the resulting helical member will either expand or contract axially upon heating. If the member 43 having the smaller coefficient of expansion is outside, the device will expand axially when heated, which is the condition desired in the present case and shown. It is to be understood that any axial movement is accompanied by some rotary angular action, and if it is desired to eliminate this, then the bimetallic elements may be made as described in the copending application of Unto U. Savolainen (one of the inventors herein) filed Nov. 3, 1943, S. N. 508,801, for Compensating thermostat, now Patent No. 2,425,687, dated August 12, 1947. However, it is not particularly important that the rotary compensation be provided herein, because any rotation applied to the valve 33 at the end of the opening 29 is of some advantage in obtaining best valve seating.

Operation is as follows:

If the heating system be assumed to be cold and then started, any steam entering the radiator to which the device is attached will force air through the inlet openings 46. This air passes up around the thermostatic element 35 and shoulder 36 and then out around the open valve 33, and through ports 29 and 17. The air being at first relatively cool does not cause expansion of the thermostatic element 35 to any point where the valve 33 will be closed.

As the radiator receives more steam it becomes heated and causes expansion of the double helical thermostatic element 35 which closes the valve 33 against further fluid escape.

The plug 37 can be adjusted to determine a position of the thermostatic element 35, wherein valve closure will occur at any desired radiator temperature. That is to say, the valve 33 by cutting off the air, in response to radiator temperature rise, before all of the air is out of the radiator tends to limit the heat output of the radiator. Likewise it prevents escape of steam. Conversely, the valve will open upon a differential temperature reduction to allow inflow of air. The operating temperature differential is quite small by use of the present device because the thermo-static element 35 per se is located in a part which is partially on the outside at the extremity of the main body of the device and is therefore very responsive to outside temperature effects. Upon cooling it is one of the first things to cool and therefore causes compensating action. Furthermore hot escaping fluid is forced to effect a more or less turbulent helical flow with intimate contact over the entire thermostat 35 thus assuring a prompt response.

Anti-flooding operation occurs when condensate gathers in the float chamber 1. This lifts the float 5 which in turn lifts the stem 31 free of the coil 35 to close valve 33 in port 29.

Although the drawings are much enlarged, the actual size of the cartridge constituted by the cylinder 19 is about one and one-half inches long by three-eighths inches outside diameter. Of course, it is not limited to these dimensions. The cartridge is readily replaceable. Thus, if on a given radiator a different size of outlet at 29 is found to be desirable, this may be obtained simply by removing the old cartridge and inserting a new one having the proper size of outlet. This also permits of making replacements in cases where the outlet becomes clogged, rather than resorting to repair work. Such a replacement of the entire cartridge unit is not costly because of its small size and simplicity.

Another advantage of the replaceable cartridge is that the cartridges may be pre-calibrated at the factory and a wide variety may be available for meeting specific conditions. All other parts of the device may be standardized independently of calibration.

Another advantage of the invention is its simplicity of manufacture and the small amount of material required therefor.

Since the thermostatic action does not depend upon a closed float valve, the anti-flooding function may be taken care of by the open bottom float 5. Such a bell is not subject to damage by water hammers and the like, as were the prior closed bells and bellows which were often used.

While the adaptability of the cartridge to use with inverted open bell-shaped float is of importance, it is to be understood that if the closed type of float is desired the device is operative therewith. The advantage in connection with the open-type float is the imperviousness to damage from water hammers, as above made clear.

Figure 5:
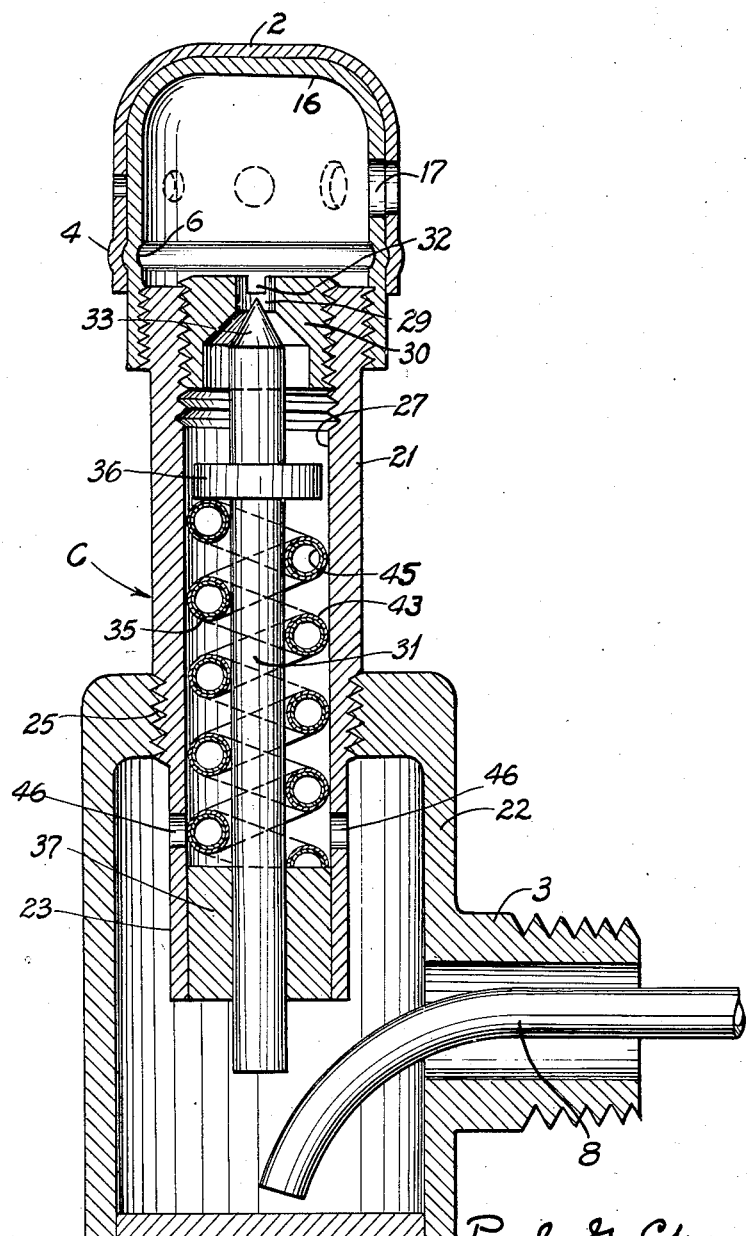
Fig. 5 is a view similar to Fig. 2 showing an alternative embodiment of the invention.

In Fig. 5 is shown an alternative embodiment in which like numerals designate like parts where applicable. In this case the member 21 is threaded into a chamber 22 which carries no float. This form operates thermostatically just as the device of Figs. 1 and 2 but not as an anti-flooding device. It is applicable to certain modern heating systems wherein the arrangements of radiators, vent lines etc., is such that flooding is very unlikely, if not impossible. The result is an even more compact unit than that of Figs. 1 and 2. In Fig. 5 a different form of cap 16 is shown in which is vent 17.

For easier adjustment the vent 29, in the case of Fig. 5, is placed in an adjustable plug 30, the tool-engaging slot 32 of which may be reached from the outside after removal of cap 16. In this case no adjustment is needed at the bottom at 37. A dealer may carry a variety of interchangeable plugs 30 with various sizes of orifices 29 for adaptation of the device to various conditions met with. Or, instead of having the plugs interchangeable one may be used, with an oversize orifice. In connection with this would then be used a snugly fitting rotatable cup 2 grooved at 4 and sprung over bead 6 on cap 15 (Fig. 2), said cup 2 having punched in it a belt of various sized outlets to register selectively with outlet 17 upon turning the cup. These features can of course also be applied to the Fig. 2 construction.

In view of the above, it will be seen that the several objects of the invention are achieved and other advantageous results attained.

As many changes could be made in the above constructions without departing from the scope of the invention, it is intended that all matter contained in the above description shall be interpreted as illustrative and not in a limiting sense.

We claim:

1. A thermostatic vent valve unit for removable connection into a chamber, comprising a unitary tubular casing having an outlet port in one end and an inlet to its interior adjacent its other end, said casing being exteriorly formed intermediate its length for detachable connection into the wall of a chamber with said one end outside and said other end inside the chamber, a valve member in said casing including a stem having an abutment, said stem extending slidably through said other end of the casing and axially movable between a position closing said outlet port and a position spaced from the outlet port, and an axially expansible helical bimetallic thermostatic element in said casing surrounding said stem and disposed between said other end of the casing and the abutment on said stem, said element expanding axially upon heating to move the stem and valve member to close said outlet port.

2. A vent valve for radiators and the like, comprising a chamber having a fitting whereby it may be connected into a radiator or the like in communication therewith, a thermostatic vent valve unit comprising a unitary tubular casing having an outlet port in one end and an inlet to its interior adjacent its other end, said casing being detachably connected intermediate its length into said chamber with said one end outside the chamber and said other end inside the chamber, a valve member in said casing including a stem having an abutment, said stem extending slidably through said other end of the casing and axially movable between a position closing said outlet port and a position spaced from the outlet port, and an axially expansible helical bimetallic thermostatic element in said casing surrounding said stem and disposed between said other end of the casing and the abutment on said stem, said element expanding axially upon heating to move the stem and valve member to close said outlet port.

3. A vent valve for radiators and the like, comprising a float chamber having a fitting whereby it may be connected into a radiator or the like in communication therewith, a float in said chamber, a thermostatic vent valve unit comprising a unitary tubular casing having an outlet port in one end and an inlet to its interior adjacent its other end, said casing being detachably connected intermediate its length into the top of said chamber with its said one end outside and above said chamber and its said other end inside the chamber, a valve member in said casing including a stem having an abutment, said stem extending slidably through said other end of the casing into said chamber where its lower end is engageable by the float, said valve member and its stem being axially movable between a position closing said outlet port and a position spaced from the outlet port, and an axially expansible helical bimetallic thermostatic element in said casing surrounding said stem and disposed between said other end of the casing and the abutment on said stem, said element expanding axially upon heating to move the stem and valve member to close said outlet port.

PAUL G. CHACE.
UNTO U. SAVOLAINEN.

REFERENCES CITED

The following references are of record in the file of this patent:

UNITED STATES PATENTS

| Number | Name | Date |
| --- | --- | --- |
| 2,121,259 | Parsons | June 21, 1938 |
| 1,464,756 | Feuser et al. | Aug. 14, 1923 |
| 2,057,041 | McDonough et al. | Oct. 13, 1936 |
| 1,761,685 | Russell | June 3, 1930 |
| 1,598,241 | Chadeayne | Aug. 31, 1926 |
| 1,340,439 | Feuser | May 18, 1920 |
| 1,881,246 | Simpson | Oct. 4, 1932 |